United States Patent
Daborn et al.

(10) Patent No.: US 9,340,083 B2
(45) Date of Patent: May 17, 2016

(54) SUSPENSION ARRANGEMENT

(71) Applicant: Alexander Dennis Limited, Falkirk (GB)

(72) Inventors: Mark Daborn, Larbert (GB); Simon Bowers, Surrey (GB)

(73) Assignee: Alexander Dennis Limited, Falkirk (GB)

( * ) Notice: Subject to any disclaimer, the term of this patent is extended or adjusted under 35 U.S.C. 154(b) by 0 days.

(21) Appl. No.: 14/218,397

(22) Filed: Mar. 18, 2014

(65) Prior Publication Data

US 2014/0346747 A1   Nov. 27, 2014

(30) Foreign Application Priority Data

Mar. 18, 2013   (GB) .................................. 1304949.9

(51) Int. Cl.
*B60G 9/02* (2006.01)
*B60G 11/27* (2006.01)
*B60G 11/28* (2006.01)

(52) U.S. Cl.
CPC *B60G 9/02* (2013.01); *B60G 11/27* (2013.01); *B60G 11/28* (2013.01); *B60G 2200/314* (2013.01); *B60G 2200/341* (2013.01); *B60G 2204/122* (2013.01); *B60G 2204/126* (2013.01); *B60G 2300/14* (2013.01); *B60G 2300/38* (2013.01)

(58) Field of Classification Search
CPC .......... B60G 9/02; B60G 11/27; B60G 11/28; B60G 2204/126; B60G 2300/38; B60G 2200/314; B60G 2300/14; B60G 2204/122; B60G 2200/341

USPC .......... 280/124.1, 124.104, 124.106, 124.11, 280/124.153, 124.162
See application file for complete search history.

(56) References Cited

U.S. PATENT DOCUMENTS

| | | | | |
|---|---|---|---|---|
| 2,814,480 | A | * | 11/1957 | Clark et al. .................... 267/256 |
| 3,387,858 | A | * | 6/1968 | Harbers, Jr. .................... 280/439 |
| 3,801,086 | A | * | 4/1974 | Raidel .............................. 267/67 |
| 4,262,929 | A | * | 4/1981 | Pierce .................... 280/124.108 |
| 4,415,179 | A | | 11/1983 | Marinelli |
| 4,946,189 | A | * | 8/1990 | Manning ........................ 180/349 |
| 5,403,031 | A | * | 4/1995 | Gottschalk et al. .......... 280/86.5 |
| 5,988,672 | A | * | 11/1999 | VanDenberg ................. 280/683 |
| 6,135,470 | A | * | 10/2000 | Dudding ................ 280/124.128 |

(Continued)

FOREIGN PATENT DOCUMENTS

WO   2011101654   8/2011

OTHER PUBLICATIONS

US Dept. of Transportation, Federal Transit Administration: Study & Report to Congress: Applicability of Maximum Axle Weight Limitations to Over-the-Road and Public Transit Buses (Dec. 2003) at http://caltransit.org/cta/assets/FTA%20Axle%20On%20 Axle.pdf.*

*Primary Examiner* — Paul N Dickson
*Assistant Examiner* — Darlene P Condra
(74) *Attorney, Agent, or Firm* — Young Basile Hanlon & MacFarlane P.C.

(57) ABSTRACT

A passenger service vehicle includes one or more suspension mounts. Each suspension mount attaches a front axle to a chassis. In some cases, the axle is a drop beam axle. The or each suspension mount is further mounted with one or more suspension components of the following: suspension arm links, suspension air springs, suspension dampeners, anti-roll bars and Panhard rods.

16 Claims, 15 Drawing Sheets

(56) References Cited

U.S. PATENT DOCUMENTS

| | | | |
|---|---|---|---|
| 6,241,266 B1* | 6/2001 | Smith et al. | 280/124.116 |
| 6,382,659 B1* | 5/2002 | Simard | 280/686 |
| 6,428,027 B1* | 8/2002 | Stuart | 280/124.157 |
| 6,508,482 B2* | 1/2003 | Pierce et al. | 280/124.116 |
| 6,513,798 B2* | 2/2003 | Taghizadeh et al. | 267/64.27 |
| 6,758,294 B2* | 7/2004 | Peddycord et al. | 180/89.12 |
| 6,966,568 B2* | 11/2005 | Wen et al. | 280/124.175 |
| 7,229,088 B2* | 6/2007 | Dudding et al. | 280/124.17 |
| 7,419,146 B2* | 9/2008 | Platner et al. | 267/229 |
| 7,513,517 B2* | 4/2009 | Barton et al. | 280/124.116 |
| 7,559,400 B2* | 7/2009 | Smith | 180/291 |
| 7,669,866 B2* | 3/2010 | Peaker et al. | 280/124.128 |
| 7,815,199 B2* | 10/2010 | Peterson | 280/5.515 |
| 7,850,195 B2* | 12/2010 | Simard et al. | 280/678 |
| 7,896,369 B2* | 3/2011 | Tomlin et al. | 280/124.116 |
| 7,971,890 B2* | 7/2011 | Richardson | 280/124.163 |
| 2005/0247502 A1* | 11/2005 | Ziech et al. | 180/253 |
| 2006/0163834 A1* | 7/2006 | Brereton et al. | 280/124.128 |
| 2006/0208464 A1* | 9/2006 | Raidel et al. | 280/678 |
| 2007/0235972 A1* | 10/2007 | Schmitz | 280/124.156 |
| 2008/0258361 A1* | 10/2008 | Wen et al. | 267/52 |
| 2009/0020973 A1* | 1/2009 | Richardson | 280/124.17 |
| 2009/0194963 A1 | 8/2009 | Tomlin et al. | |
| 2009/0278329 A1 | 11/2009 | VanDenberg et al. | |
| 2010/0213682 A1* | 8/2010 | Luna | 280/124.153 |
| 2011/0163514 A1* | 7/2011 | Saieg et al. | 280/124.116 |
| 2013/0001914 A1* | 1/2013 | Batdorff | 280/124.162 |
| 2013/0062852 A1* | 3/2013 | Dodd | 280/124.117 |

* cited by examiner

SUSPENSION ARRANGEMENT

REFERENCE TO RELATED APPLICATION

The application claims priority to United Kingdom Application No. 1304949.9 which was filed on Mar. 18, 2013.

TECHNICAL FIELD

The invention relates to the field of vehicles, such as passenger service vehicles. In particular, but not exclusively, the invention relates to suspension arrangements, or chassis and suspension arrangements, for such passenger service vehicles. Further, the invention relates to, but is not limited to, associated apparatus, structures, vehicles and methods.

BACKGROUND

There is a need for passenger service vehicles, such as coaches and buses, to have both good ride and good handling characteristics. However, achieving both can often lead to complex suspension arrangements, which can be costly and space prohibitive (i.e., the overall structure of the suspension arrangement may impede on the occupant or passenger space within the vehicle). Further, such complex systems may unhelpfully increase the overall weight of the vehicle.

As such, there is a continuing desire to provide suspension and chassis arrangements that are cost effective, can be installed in a limited space so as not to unduly restrict occupancy of the vehicle, or space within the vehicle, yet at the same time provide both good ride and handling characteristics, while at the same time minimizing the weight of the vehicle.

This background serves to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

According to a first aspect of the invention, there is provided a suspension arrangement for a passenger service vehicle.

The suspension arrangement may include one or more suspension mounts. The suspension mounts may be configured to attach an axle, such as a front axle, of a passenger service vehicle to a chassis. The suspension mounts may be configured to attach with a drop-beam axle. The suspension arrangement may include two suspension mounts, e.g., a left-hand mount and a right-hand mount.

The suspension mounts may be configured to mount with one or more of the following: suspension arm links, such as radius arms links, suspension air springs, suspension dampeners (e.g., telescoping dampeners), anti-roll bars, Panhard rods, or the like. The suspension arrangement may include one or more of the following: suspension arm links, such as radius arms links, suspension air springs, suspension dampeners (e.g., telescoping dampeners), anti-roll bars, Panhard rods, or the like, mounted with the chassis and the axle, using the suspension mount.

The suspension mounts may include one or more mounting apertures configured to allow for mounting (e.g., using bushes, bolts, or the like) of the arms links, air springs, etc. The mounting apertures may be preformed with the mount.

Each suspension mount may include a dished surface configured to allow mounting of an air spring. The dished surface may be angled from a body axis of the suspension mount. The angle may be between 90 and 100 degrees. The angle may be between 95 and 100 degrees. The angle may be 98 degrees. The suspension arrangement may be configured such that an air spring, or the like, is housed between the dished portion and a portion of the chassis.

Each suspension mount may include a body portion extending between the dished surface and an axle-mount portion. The body portion may include one or more curved ribs. The ribs may provide a rigid mount, while minimizing weight. The axle-mount portion may include one or more depending lugs. The lug or each lug may include mounting apertures. The suspension mount may be a unitary mount (e.g., from a single cast).

The suspension arrangement may additionally or alternatively include a suspension arrangement associated with the rear axle. The rear-axle can be considered the drive axle. One or more links, such as fixed links, may be used to attach the chassis to, for example, a rear differential. Such a rear differential may be configured to connect a drive shaft and the rear wheels.

The above mentioned configuration may allow for short rear overhangs with transverse mounted engines.

According to a further aspect of the invention, there is provided a passenger service vehicle. The vehicle may include one or more suspension arrangements having one or more of the features of the first aspect.

The vehicle may have an overall length of about 35 feet or less. For example, the vehicle may have an overall length of between 25 feet and 35 feet. In some examples, the vehicle may have an overall length of approximately 35 feet. Such a vehicle may be configured to provide at least 35 passenger seats. Such a vehicle may have an unladen weight of around 25,000 lbs or less (e.g., roughly 20,000 lbs or even less).

In other examples, the vehicle may have an overall length of approximately 30 feet. Such a vehicle may be configured to provide at least 27 passenger seats. Such a vehicle may have an unladen weight of around 22,000 lbs or less (e.g., 18,000 lbs or even less).

The vehicle may have a front overhang (i.e., the distance from the front of the vehicle to the center of a front axle) of around 250 cm, 230 cm or less (e.g., 226 cm). The vehicle may have a rear overhang (i.e., the distance from the rear of the vehicle to the center of a rear axle) of around 300 cm, 275 cm or less (e.g., 271 cm).

The vehicle may include a longitudinally mounted engine (e.g., a six cylinder longitudinally mounted engine). Such an engine may be compliant with, for example, environmental protection agency requirements. The vehicle may be a single-deck vehicle. The vehicle may include at least two passenger doors. The vehicle may include a vertical exit exhaust. The vehicle may include an air conditioning system. The conditions system may be mounted on the external of the vehicle. The conditioning system may be provided in a middle region of the vehicle.

The present invention includes one or more corresponding aspects, embodiments or features in isolation or in various combinations whether or not specifically stated (including claimed) in that combination or in isolation. It will be appreciated that one or more embodiments/aspects may be useful in providing suspension and chassis arrangements that are cost effective, can be installed in a limited space so as not to unduly restrict occupancy of the vehicle, or space within the vehicle, yet at the same time provide both good ride and handling characteristics.

The above summary is intended to be merely exemplary and non-limiting.

BRIEF DESCRIPTION OF THE DRAWINGS

A description is now given, by way of example only, with reference to the accompanying drawings in which:

FIG. 4 shows a perspective view of a forward chassis and suspension apparatus of the vehicle, while

DETAILED DESCRIPTION

Figure 1:
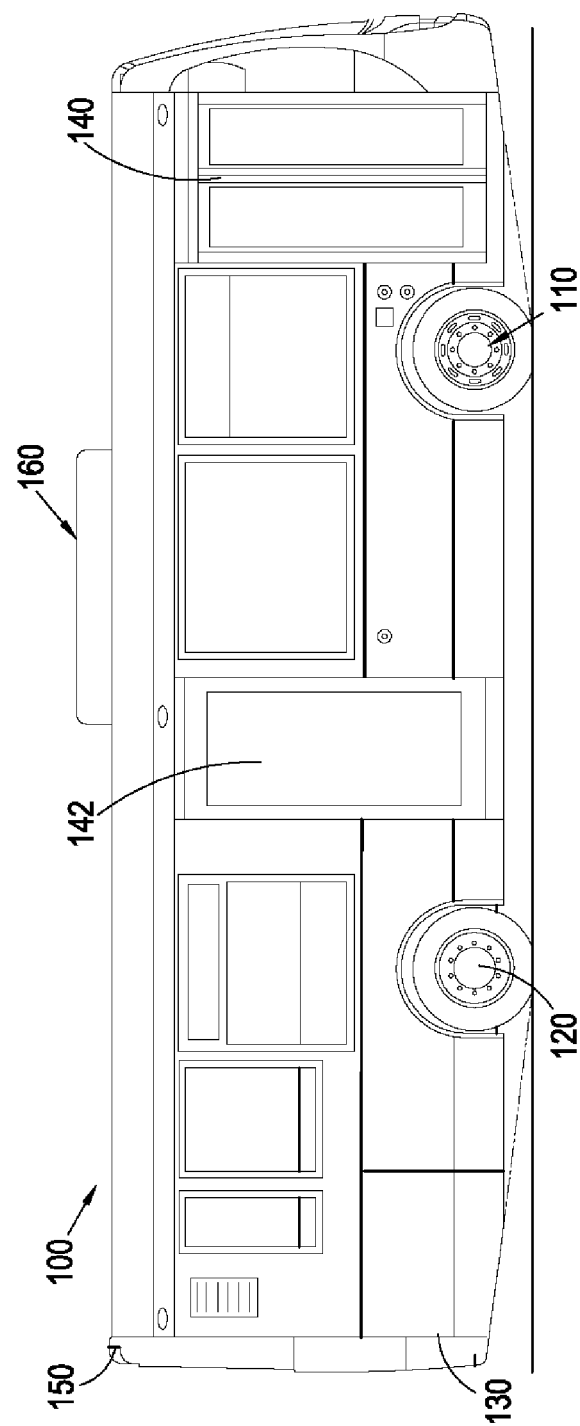
FIG. 1 shows a side view of a passenger service vehicle.

FIG. 1 shows a side view of a passenger service vehicle 100. Here, the vehicle 100 may be considered to have an overall length of about 35 feet or less (i.e., a length from the front of the vehicle 100 to the rear of the vehicle 100 of 35 feet or less).

In some examples, the vehicle 100 has an overall length of approximately 35 feet. Such a vehicle 100 may be configured to provide at least 35 passenger seats. Such a vehicle may have an unladen weight of around 25,000 lbs or less (e.g., roughly 20,000 lbs or even less). In other examples, the vehicle 100 may have an overall length of approximately 30 feet. In those cases, the vehicle 100 may be configured to provide fewer seats, such as at least 24 passenger seats, or even 27 passenger seats. Such a vehicle 100 may have an unladen weight of around 22,000 lbs or less (e.g., around 18,000 lbs or even less).

As shown, the vehicle 100 has a front overhang (i.e., the distance from the front of the vehicle 100 to the center of a front axle 110). The front overhang can be considered to be around 230 cm or less (e.g., 226 cm). The vehicle 100 also has a rear overhang (i.e., the distance from the rear of the vehicle to the center of a rear axle 120). In this example, the rear overhang can be considered to be 275 cm or less (e.g., 271 cm).

In this example, the vehicle also includes a longitudinally mounted engine 130 (e.g., a six cylinder longitudinally mounted engine 130). Such an engine 130 may be compliant with, for example, environmental protection agency requirements.

As is shown, the vehicle 100 can be considered to be a single-deck vehicle having forward and rearward passenger doors 140, 142 (in some examples, only a forward door may be provided). The vehicle 100 further includes a vertical exit exhaust 150. In addition, the vehicle 100 includes an air conditioning system 160, which is mounted external to the vehicle 100. The conditioning system 160 is provided in a middle region of the roof of the vehicle 100 and distanced from the engine so as to assist with even weight distribution.

Figure 2:
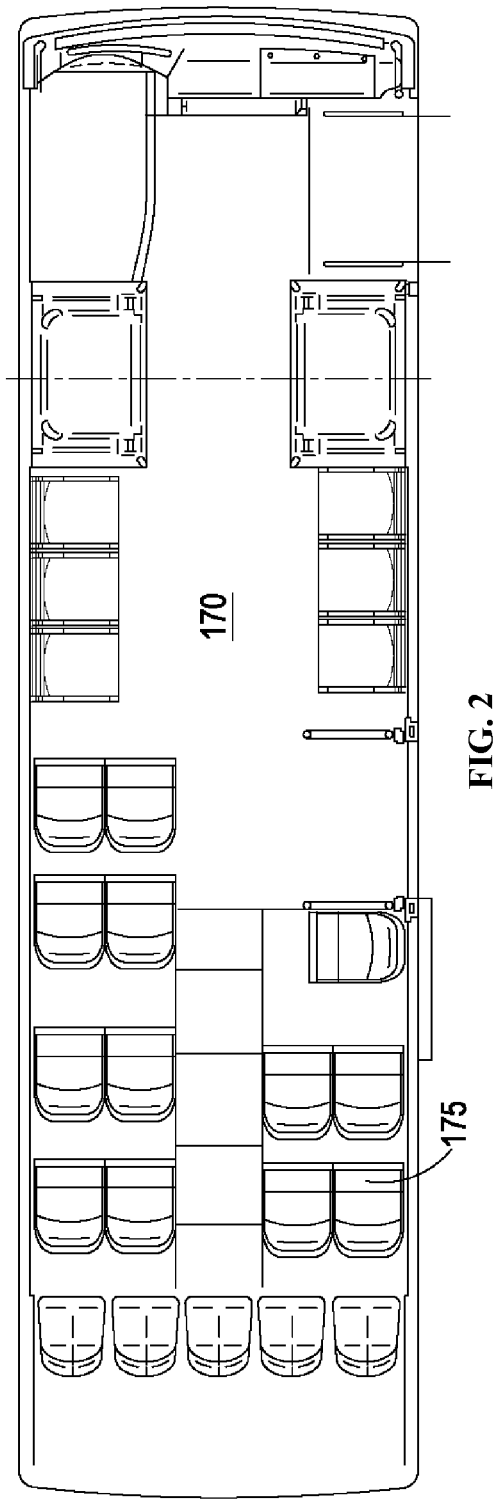
FIGS. 2-3 show plan and side views of a passenger deck of the vehicle of FIG. 1.
Figure 3:
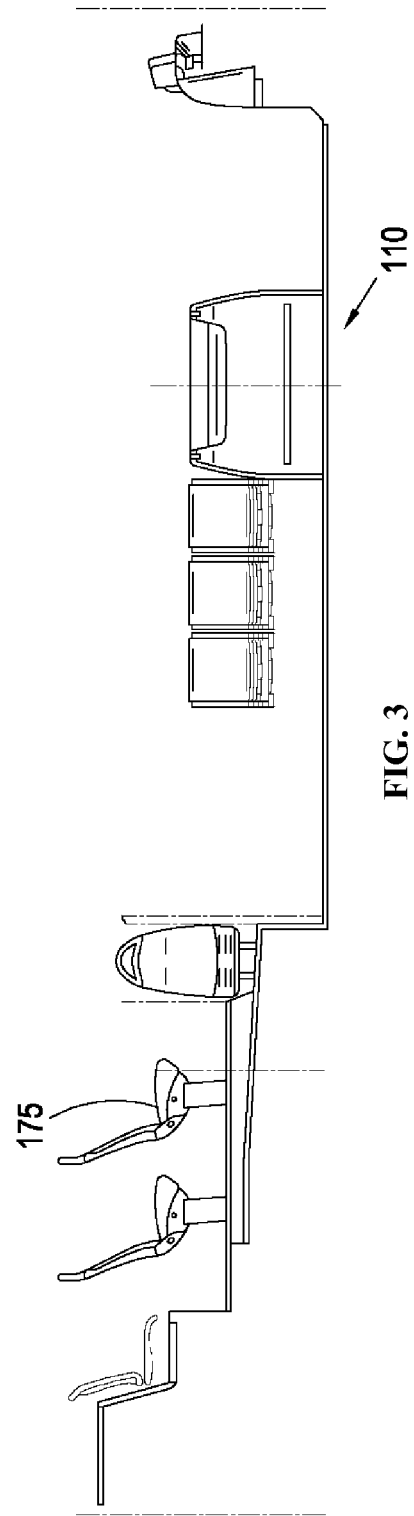

FIG. 2 shows a plan view of a passenger deck 170 of such a vehicle 100 (e.g., a 30 ft vehicle). As is shown, the passenger deck 170 of the vehicle includes a number of passenger seats 175 (in the example, 24 passenger seats are shown, although more may be provided using a different configuration). FIG. 3 shows a side view of the passenger deck 170.

As is shown, the vehicle 100 further includes front wheel arch regions 180, beneath which the front axle 110 and front wheels are located. The upper surface of the wheel arch regions 180 may serve as additional seating and/or may serve to allow storage or the like (e.g., baggage storage). In order to maximize the space within the vehicle 100, it can be useful for any wheel axle 110 and suspension arrangement to occupy the minimum space possible. However, minimizing the space used should ideally not compromise the ride and handling capabilities of the vehicle. Such packaged suspension arrangements may also assist in reducing the overall length of the vehicle, as well as minimizing the unladen weight of the vehicle.

Figure 4:
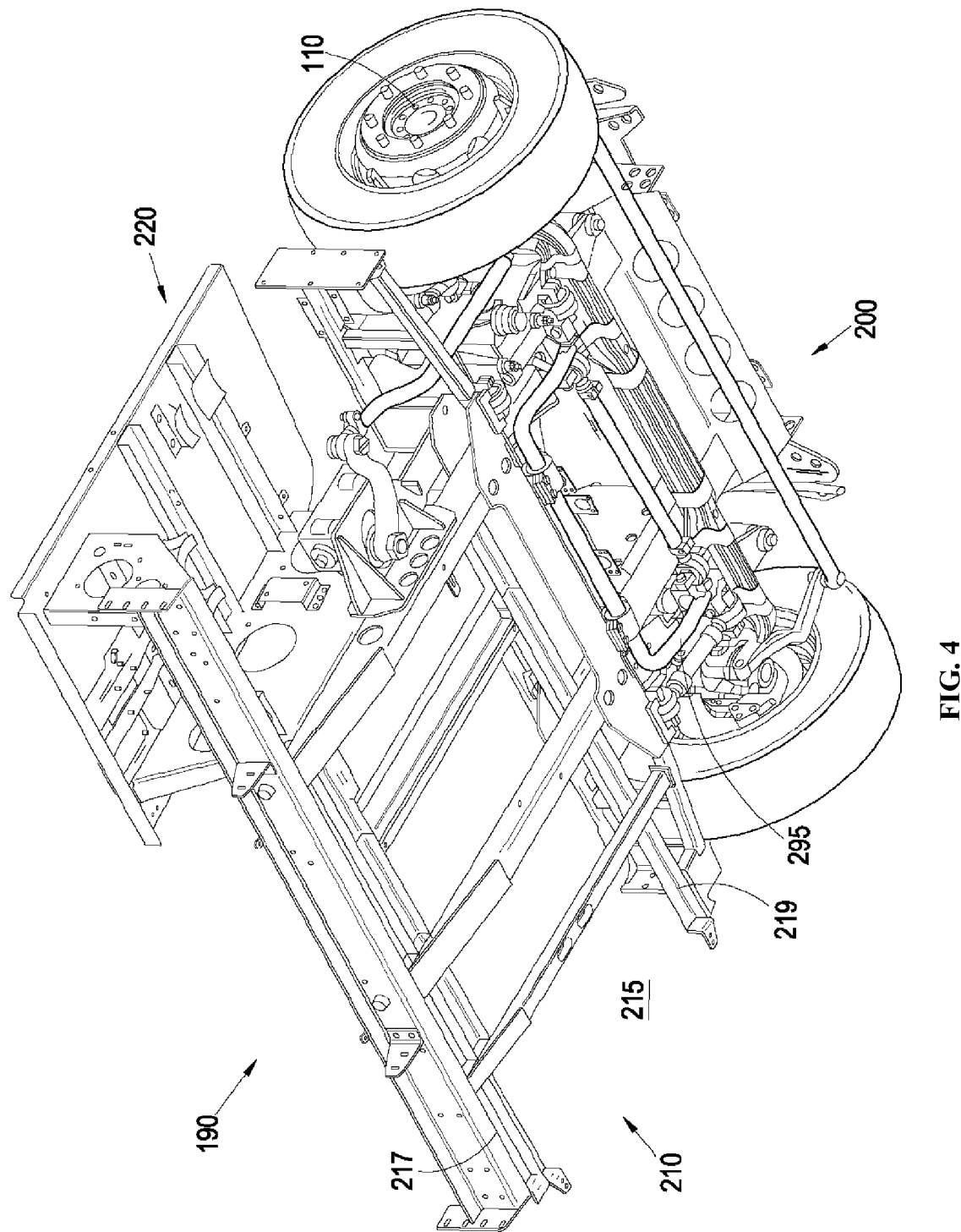

FIG. 4 shows a perspective view of the underside of the front of the vehicle 100 and, in particular, the front axle 110 and compact and effective suspension arrangement 200, as will be further described. For clarity, the body and remainder of the vehicle 100 have been omitted from these Figures. Here, a front portion of a chassis 190 is shown, which includes a passenger entrance side 210 and a driver side 220 (right and left-hand sides, or near and far sides, respectively) upon which a platform allows a driver's seat, etc., to be constructed. As is shown, the chassis 190 at the passenger entrance side 210 has an aperture 215 defined between a forward most strut 217 of the chassis 190 and the wheel region 219 of the chassis 190, such that a passenger ramp, or the like, may be fitted to the vehicle 100, if desired (see also FIG. 6).

Figure 5:
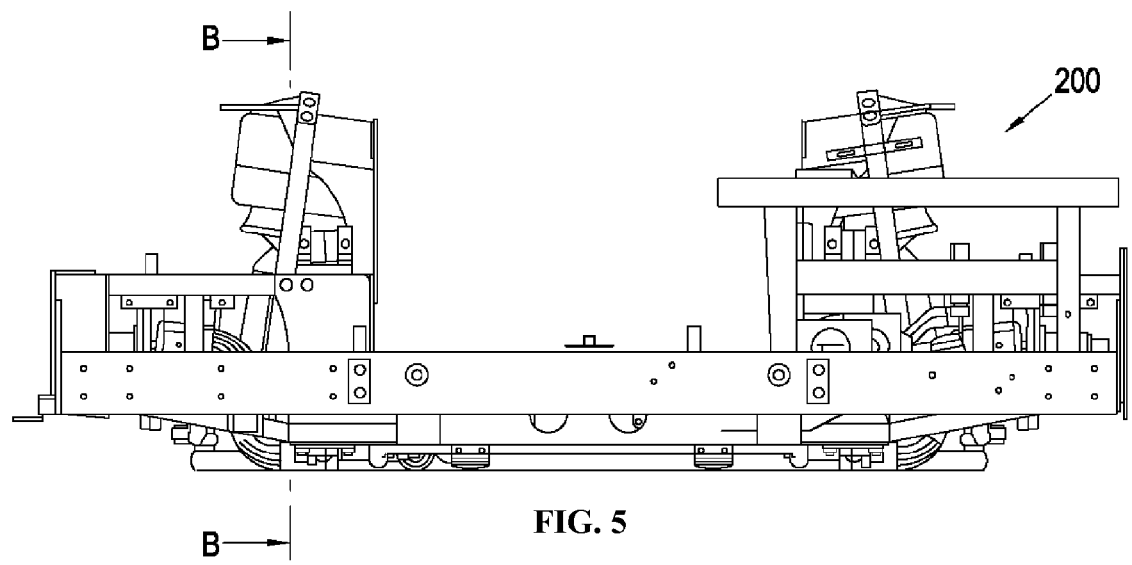
FIGS. 5-6 show front and plan views respectively.
Figure 6:
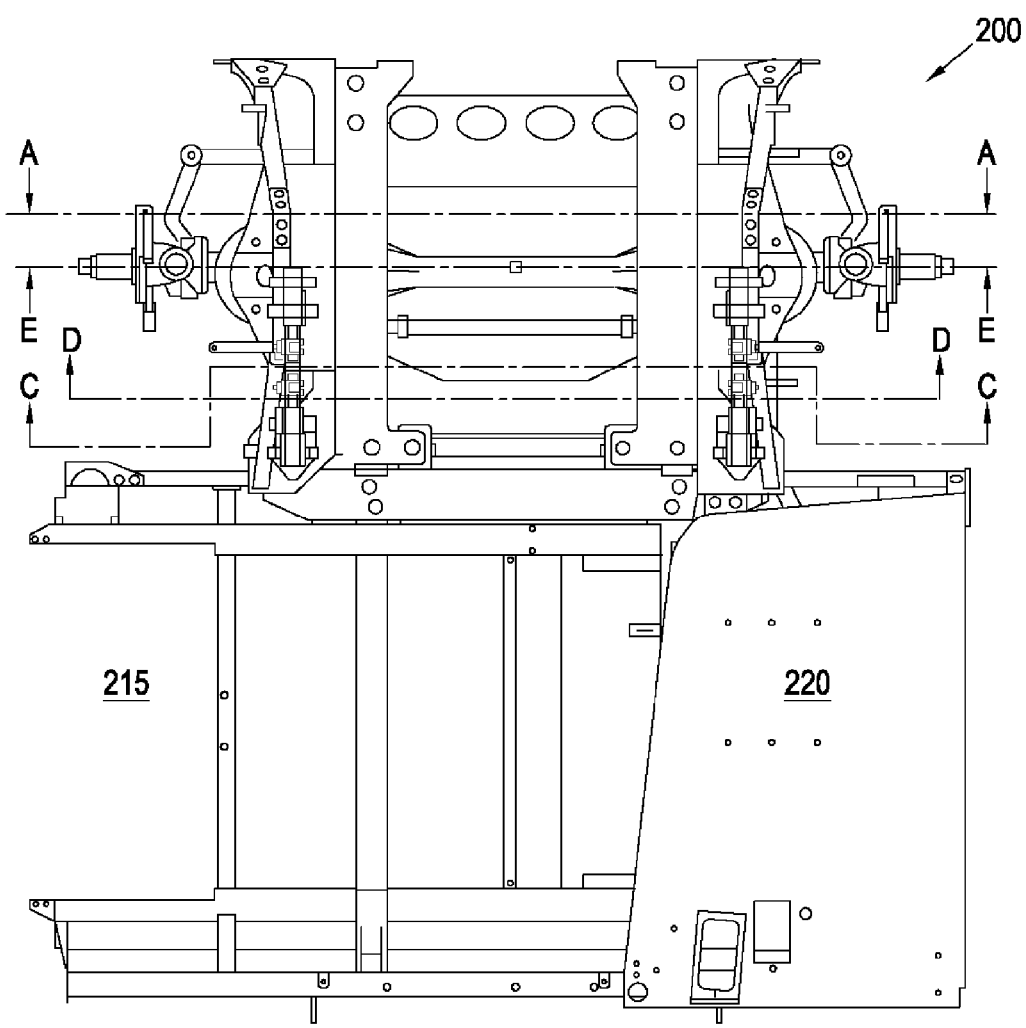
Figure 7:
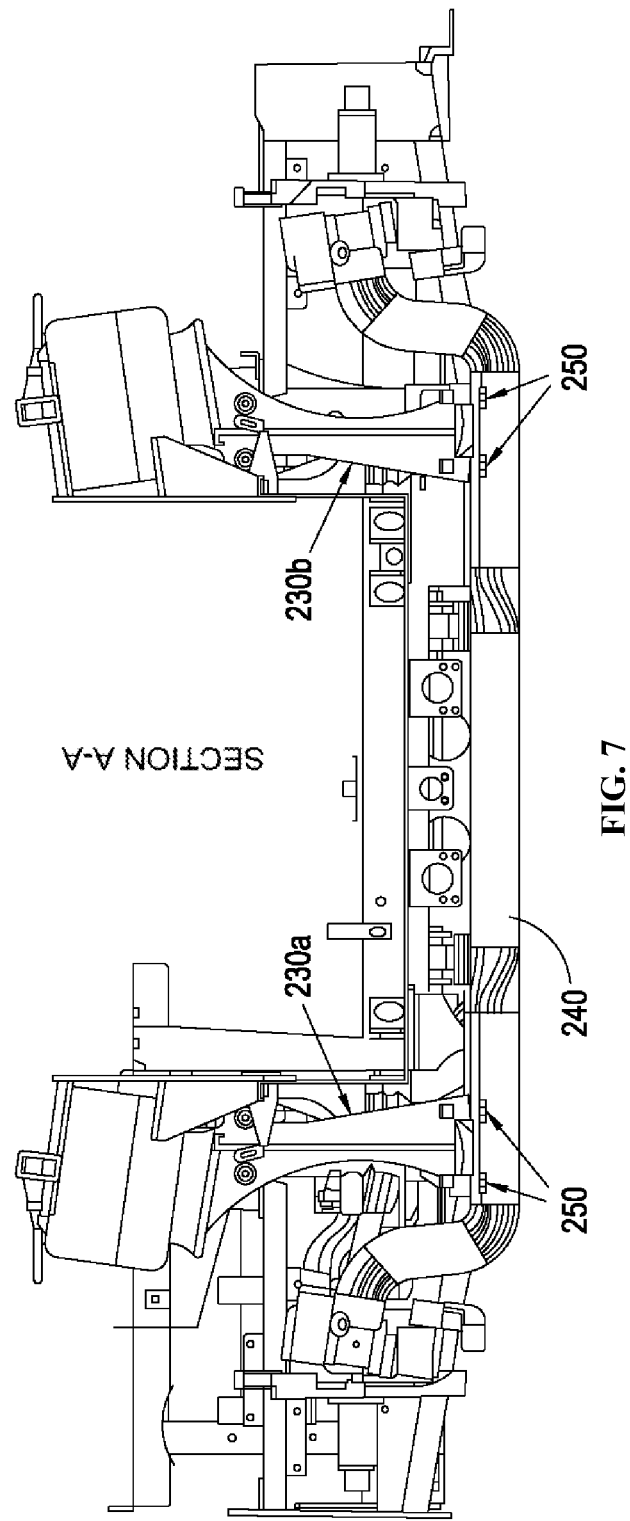
FIG. 7 shows section A-A from FIG. 6.
Figure 8:
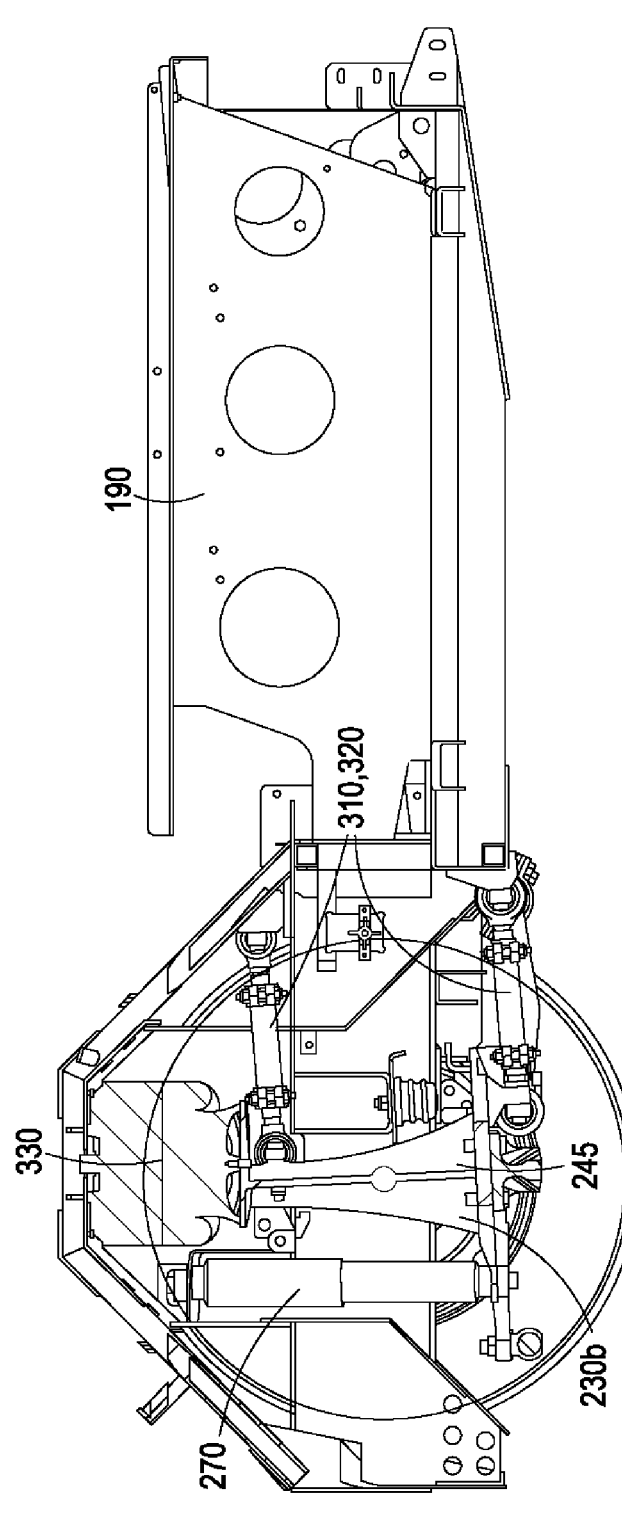
FIG. 8 shows section B-B from FIG. 4.
Figure 9:
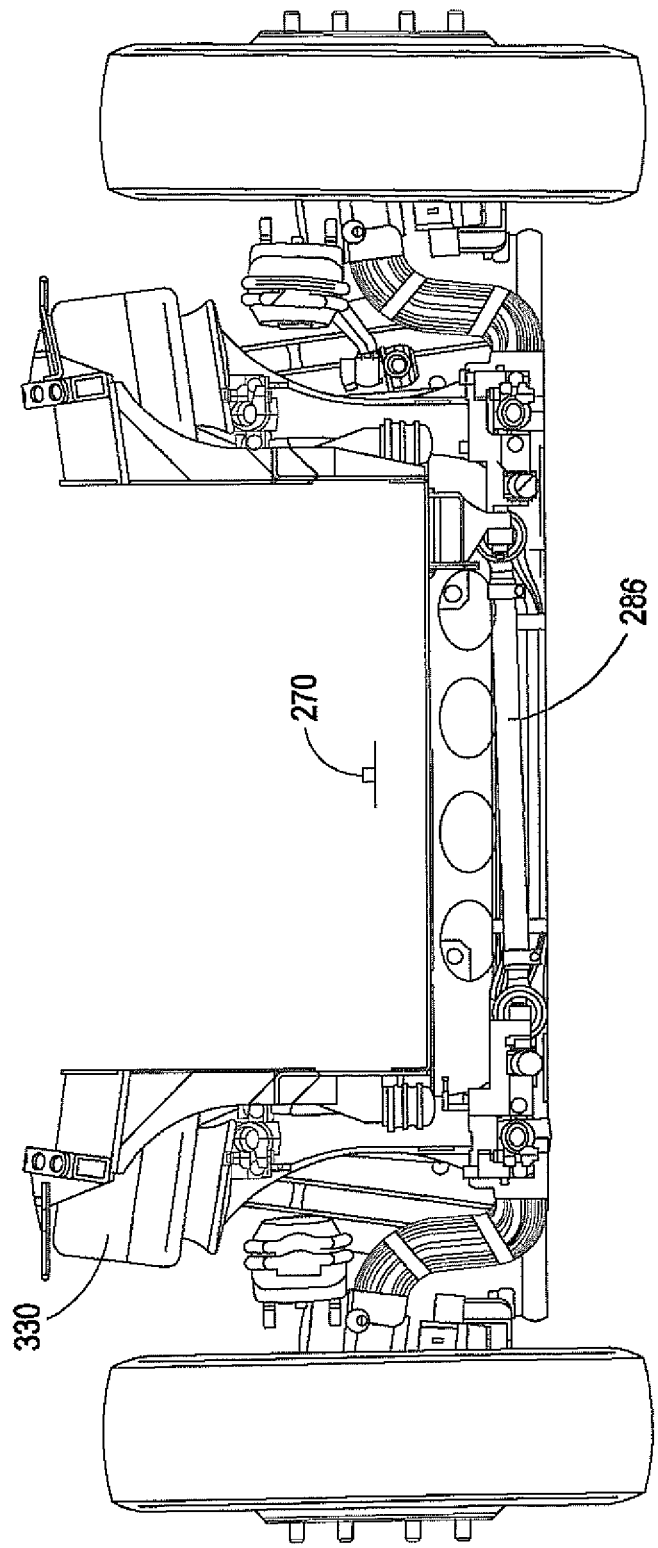
FIG. 9 shows section C-C from FIG. 6.
Figure 10:
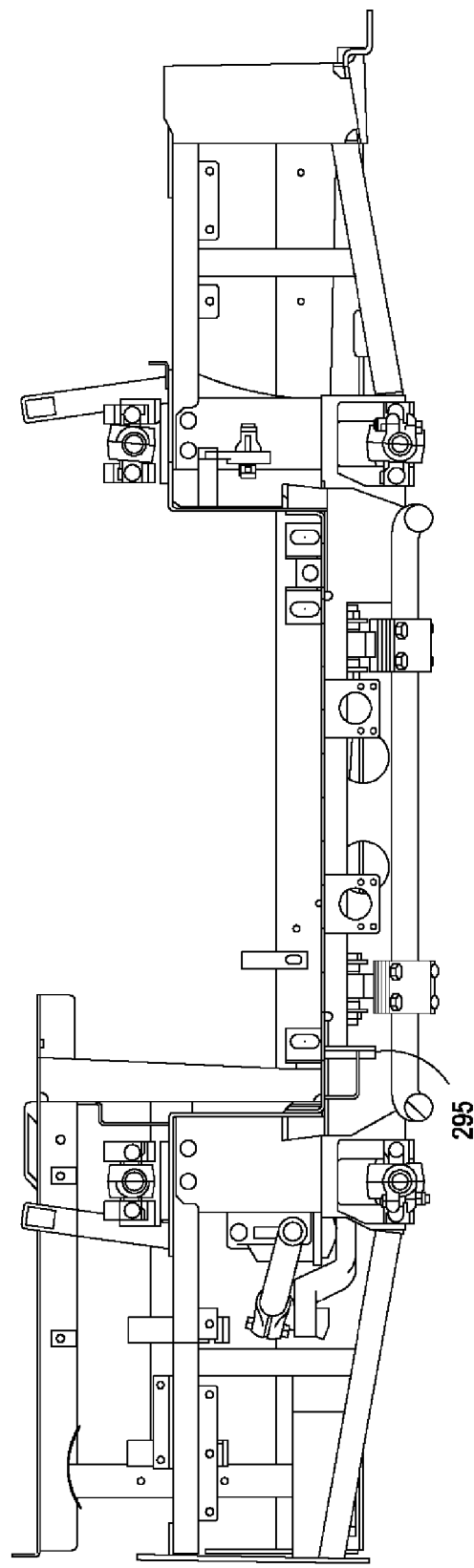
FIG. 10 shows section D-D from FIG. 6.
Figure 11:
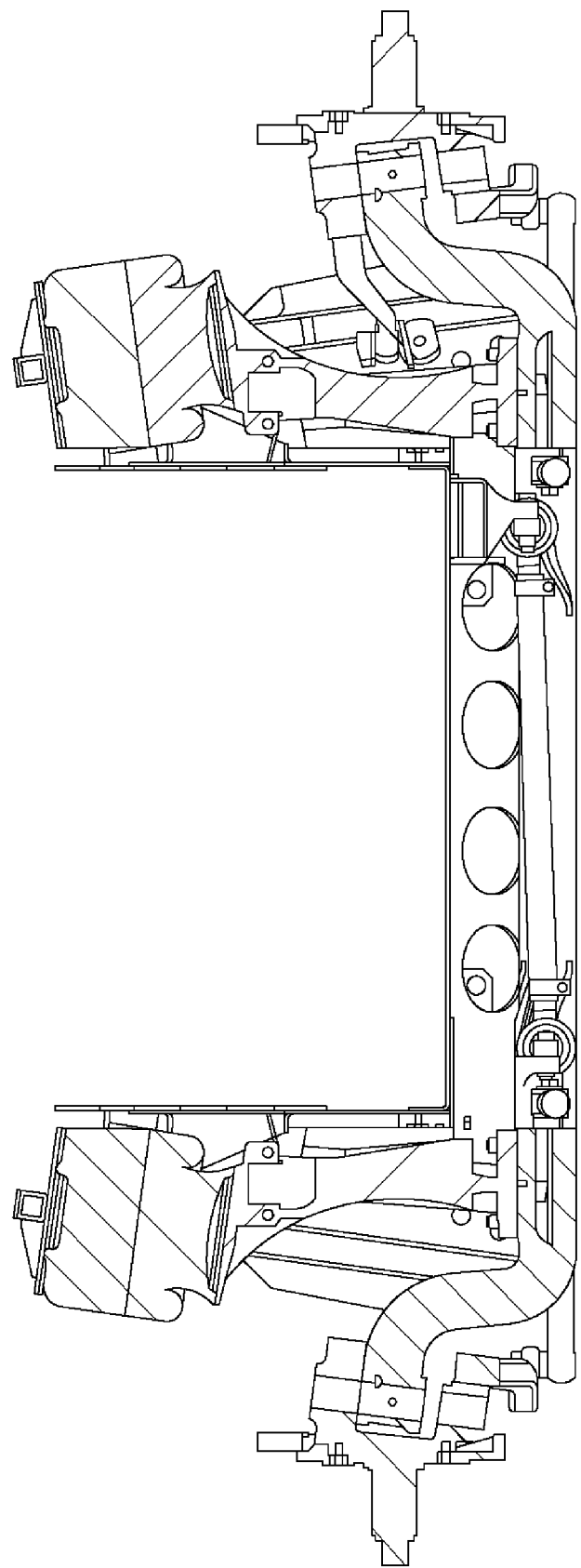
FIG. 11 shows section E-E from FIG. 6.

FIG. 5 shows a front view of the suspension arrangement 200 and front chassis 190, while FIG. 6 shows a plan view. FIG. 7 shows the section A-A, FIG. 8 shows section B-B, FIG. 9 shows section C-C, FIG. 10 shows section D-D, and FIG. 11 shows section E-E, as is shown in FIGS. 5-6. Reference numerals for the same features are common throughout the Figures.

Figure 12:
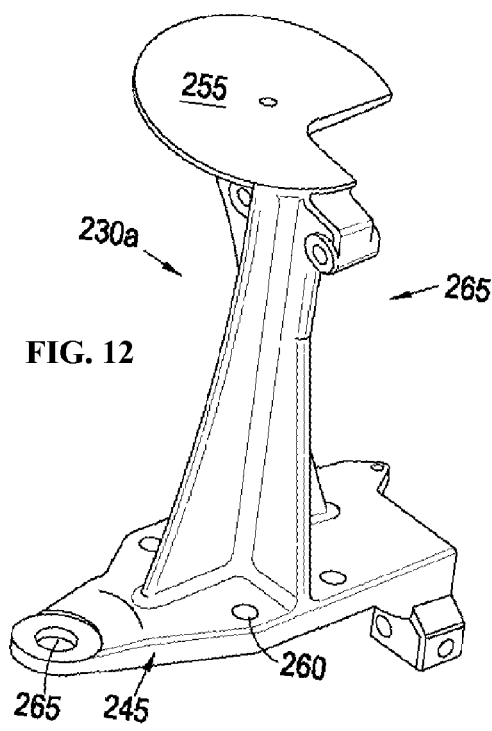
FIGS. 12-14 show views of a left-hand suspension mount.
Figure 13:
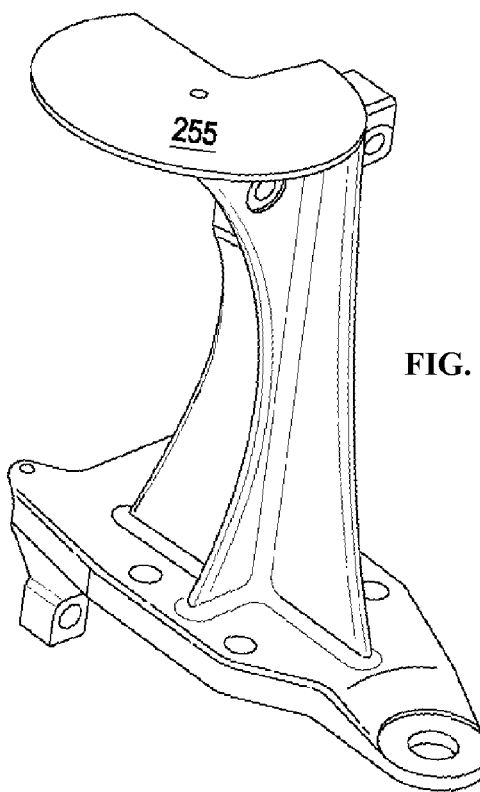
Figure 14:
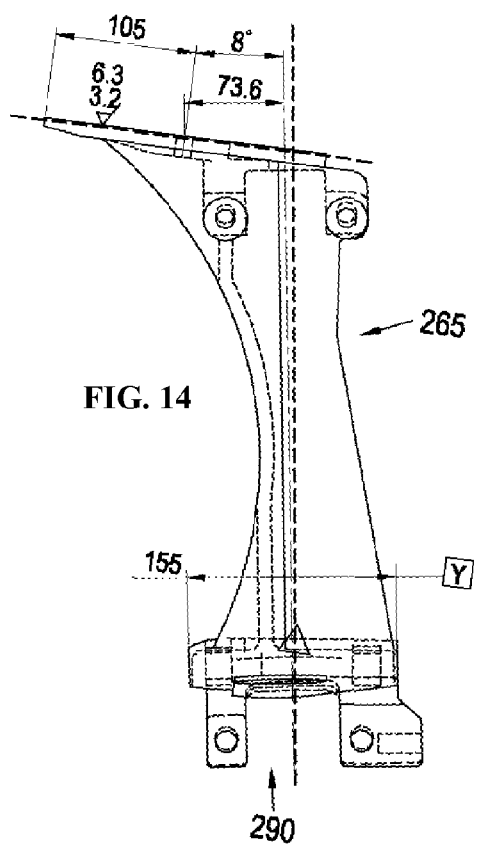
Figure 15:
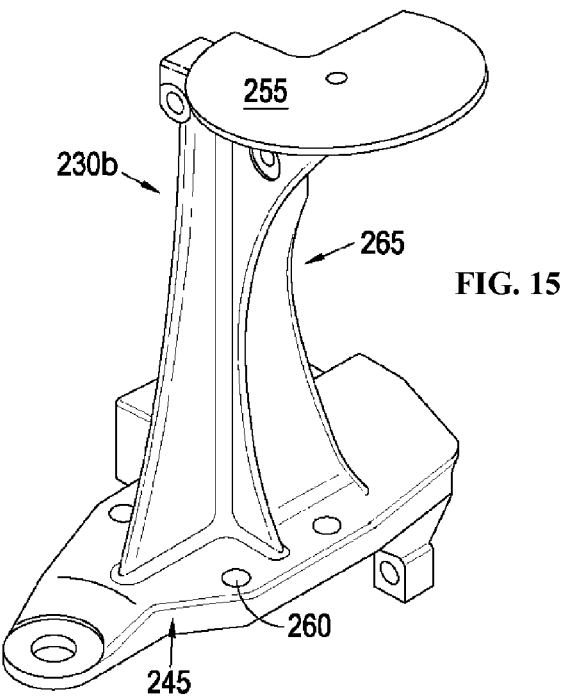
FIGS. 15-17 show views of a right-hand suspension mount.
Figure 16:
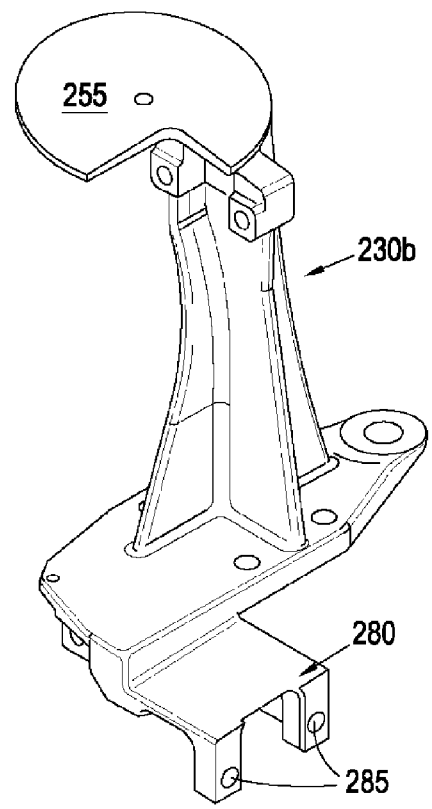
Figure 17:
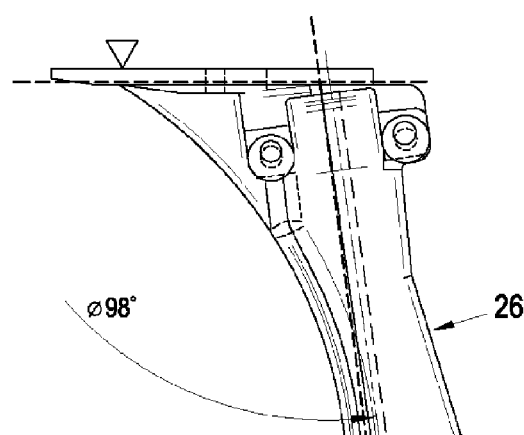
Figure 17:
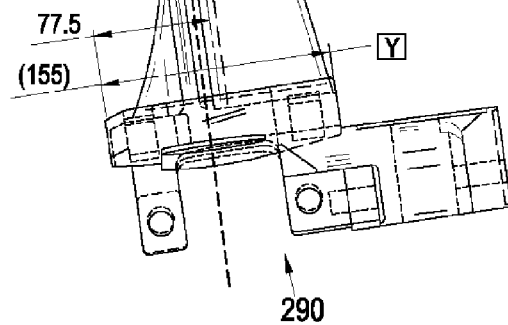
Figure 18:
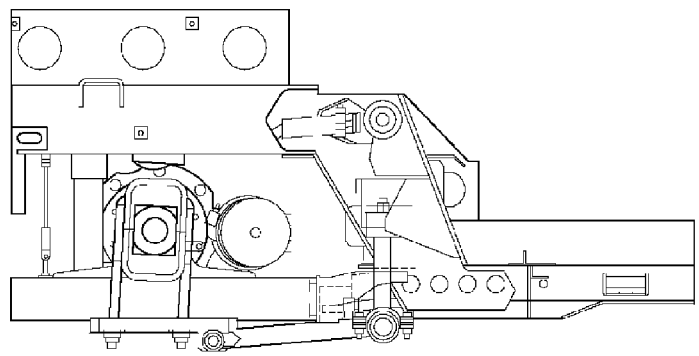
FIGS. 18-21 show various side and plan views of a rear suspension arrangement through various sections.
Figure 19:
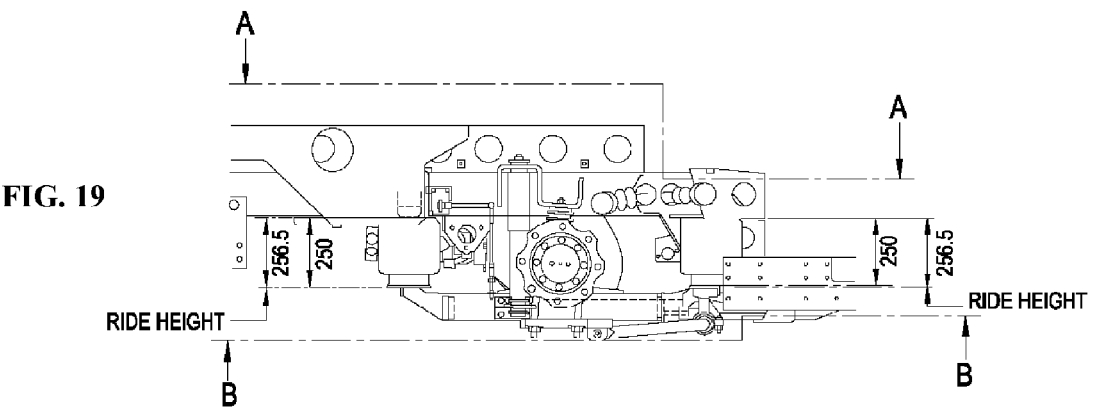
Figure 20:
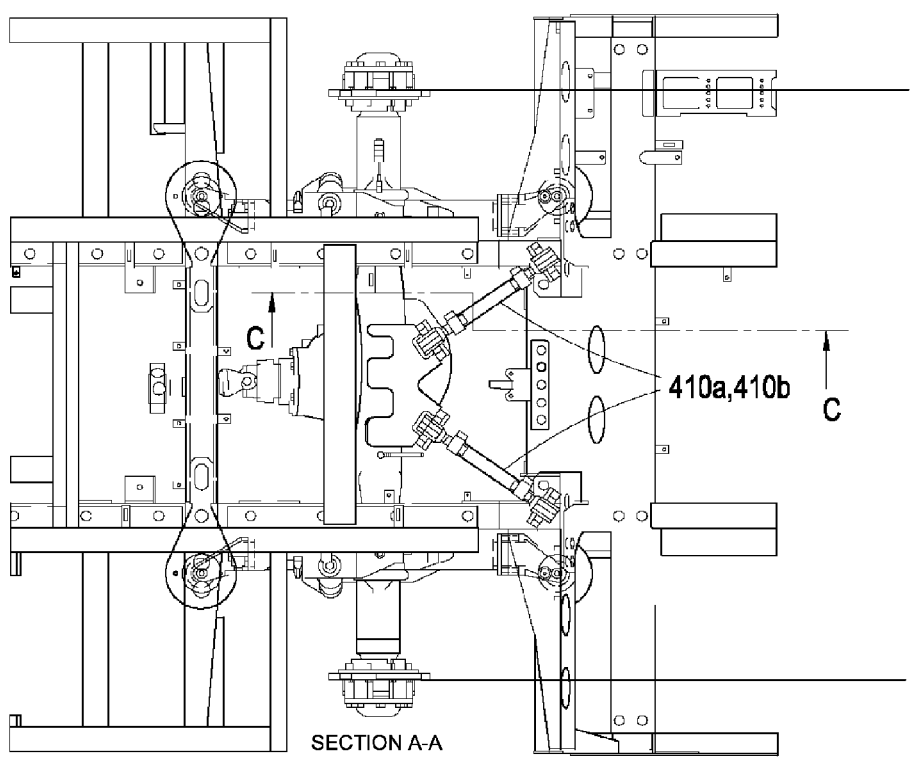
Figure 21:
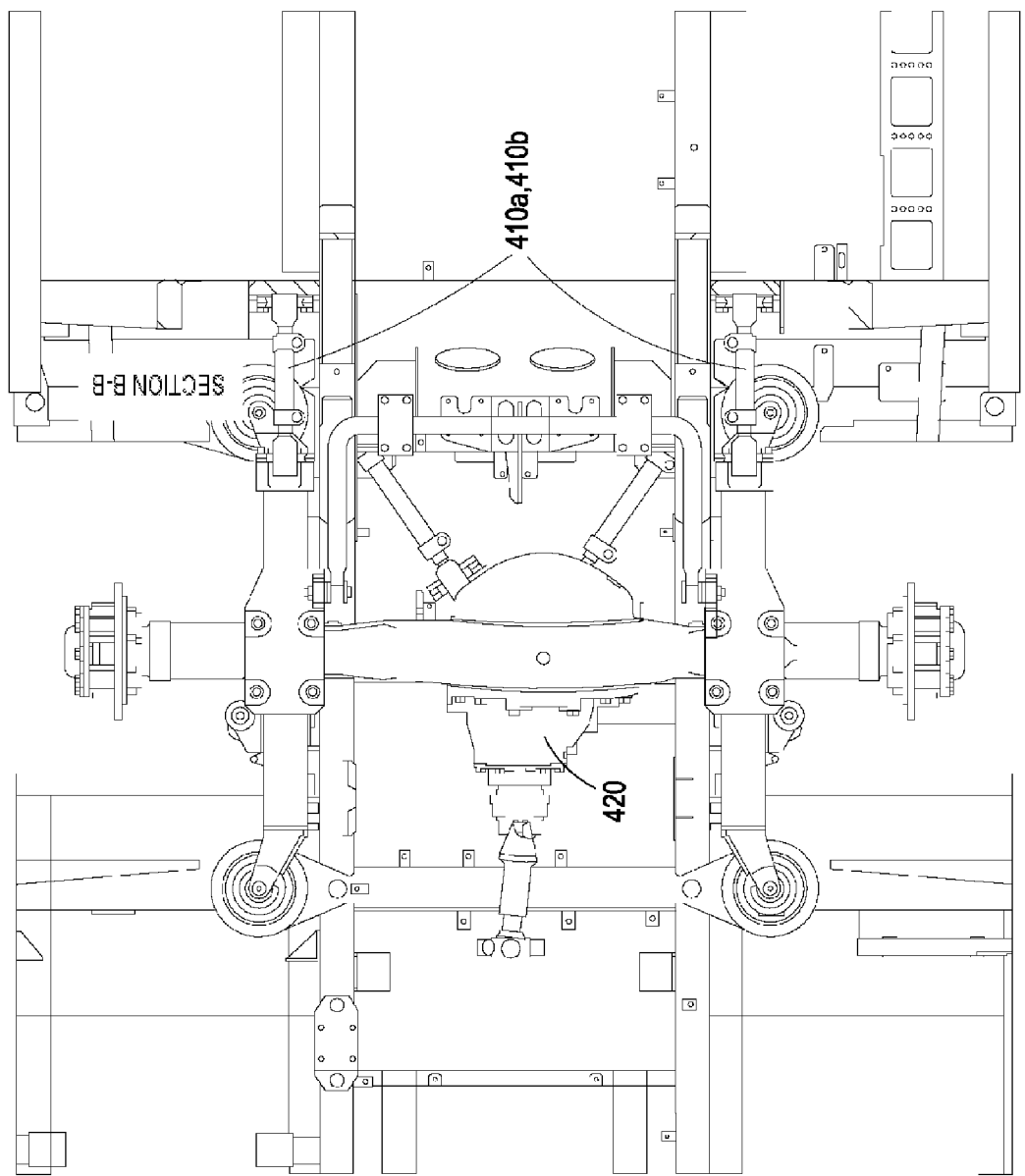

The suspension arrangement 200 includes two suspension mounts 230a, 230b, a left-hand mount 230a and a right-hand mount 230b, as will be explained. FIGS. 12-14 show the left-hand suspension mount 230a, while FIGS. 15-17 show the right-hand suspension mount 230b.

The suspension mounts 230a, 230b are configured to attach an axle 240, which, in this example, is a drop-beam axle 240. In this example, the axle 110 is configured with a braking system, as well as allows for steering of the vehicle 100.

Here, the mounts 230a, 230b include axle mount portions 245 to allow the mounts to attach to the axle 240. Here, this is achieved using preformed apertures 260 in the axle mount portions 245. Those apertures 260 can be used to attach and mount the suspension mounts (in this case using bolts 250) to the axle 240. In some examples, the axle mount portions 245 are configured such that they are essentially flat (e.g., machined flat) so as to attach to a corresponding flat (e.g., machined flat) region of the axle 240.

Here, and as is shown in FIGS. 8-9, the suspension mounts 230a, 230b are additionally configured to mount with suspension link arms 310, 320, which, in turn, effectively attach the axle 240 to the chassis 190. Here, two link arms 310, 320 are provided, which in this example are fixed link arms, with each mount and attach to the respective mounts 230a, 230b using preformed apertures 260 in the mount 230a. Here, the links 310, 320 can be considered to be configured roughly parallel to one another and pivotable so as to allow the axle to travel in generally vertical direction with respect to the chassis 190. Here, the links 310, 320 may be considered to be radius arm links and may be roughly less than 40 cm long (e.g., roughly 36 cm).

The suspension mounts 230a, 230b are further configured to mount air springs 330, or the like, with the axle 240. In this example, each suspension mount 230a, 230b includes a dished surface 255 configured to allow mounting of the air spring 330 thereto (e.g., bolting of the spring to the mount). Here, the dished surface 255 can be considered to be a partial dish, extending roughly 270 degrees for each mount 230a, 230b, as is shown in FIGS. 12-17. Here, one or both of the air springs 330 are configured to deflate (e.g., upon user request) so as to effectively lower the front of the vehicle 100 to a kneeling configuration.

Further, each dished surface 255 is angled from a body axis of the suspension mount 230a, 230b. Such a configuration can permit a compact suspension arrangement, yet also helpfully balance the angle of compression of each of the air springs 330 from a central line 270 of the axle 240. The angle from the body axis may be between 90 and 100 degrees, such as between 95 and 100 degrees. In this example, the angle from the body axis can be considered to be roughly 98 degrees. The suspension arrangement is configured such that, when mounted, each air spring 330, or the like, is essentially housed between the dished portion 255 and a portion of the chassis 190.

Each suspension mount 230a, 230b is further configured so as to mount suspension dampeners (e.g., telescoping dampeners) between the axle 240 and the chassis 190. In this example, a single dampener is provided and is attached to each mount 230a, 230b using preformed apertures 260. In other examples, more dampeners may be used.

In addition to the above, the right-hand mount 230b (i.e., on the left of FIG. 9 and as is shown in FIGS. 15-17) further includes an extended lug 280, depending from the axle-mount portion 245. The extended lug also includes mounting apertures 285 configured to mount a Panhard rod 286, or the like, between the axle 240 and the chassis 190, as is shown (e.g., see FIG. 9). Each mount further includes apertures 290 to permit mounting of the axle 240 with an anti-roll device (e.g., 295), provided on depending lugs. Of course, in other examples, such a depending lug may be provided on the other mount 230a.

As is shown in FIGS. 12-17, each suspension mount 230a, 230b essentially includes a body portion 265 that extends between the dished surface 255 and an axle-mount portion 245. In each case, the body portion 265 includes one or more curved ribs (in this example four ribs are used). The ribs provide for a rigid mount, but while minimizing weight. Here, each suspension mount can be considered to be a unitary mount (e.g., from a single cast).

The suspension mounts may be unitary (e.g., formed from a single cast) and provided with a number of preformed apertures to allow for mounting to one or more of the following: suspension arm links, such as radius arms links, suspension air springs, suspension dampeners (e.g., telescoping dampeners), anti-roll bars, Panhard rods, or the like. As such, the vehicle suspension arrangement can include one or more of the following: suspension arm links, such as radius arms links, suspension air springs, suspension dampeners (e.g., telescoping dampeners), anti-roll bars, Panhard rods, or the like, mounted with the chassis and the axle, using the suspension mount.

Providing a suspension arrangement and mount according to the features outlined above provides a suspension arrangement that is cost effective and can be installed in a limited space so as not to unduly restrict occupancy of the vehicle, or space within the vehicle yet at the same time provide both good ride and handling characteristics. In addition, the use of a unitary mount with preformed apertures improves the ease with which vehicles can be constructed, as well as improves manufacturing compliance and tolerances.

It will be appreciated by a skilled reader that individual features of the above described suspension apparatus 200 and chassis 190 may be used in combination, without the need for all the features disclosed in the various figures being essential to provide the benefits of an improved suspension arrangement and passenger service vehicle.

Figure 22:
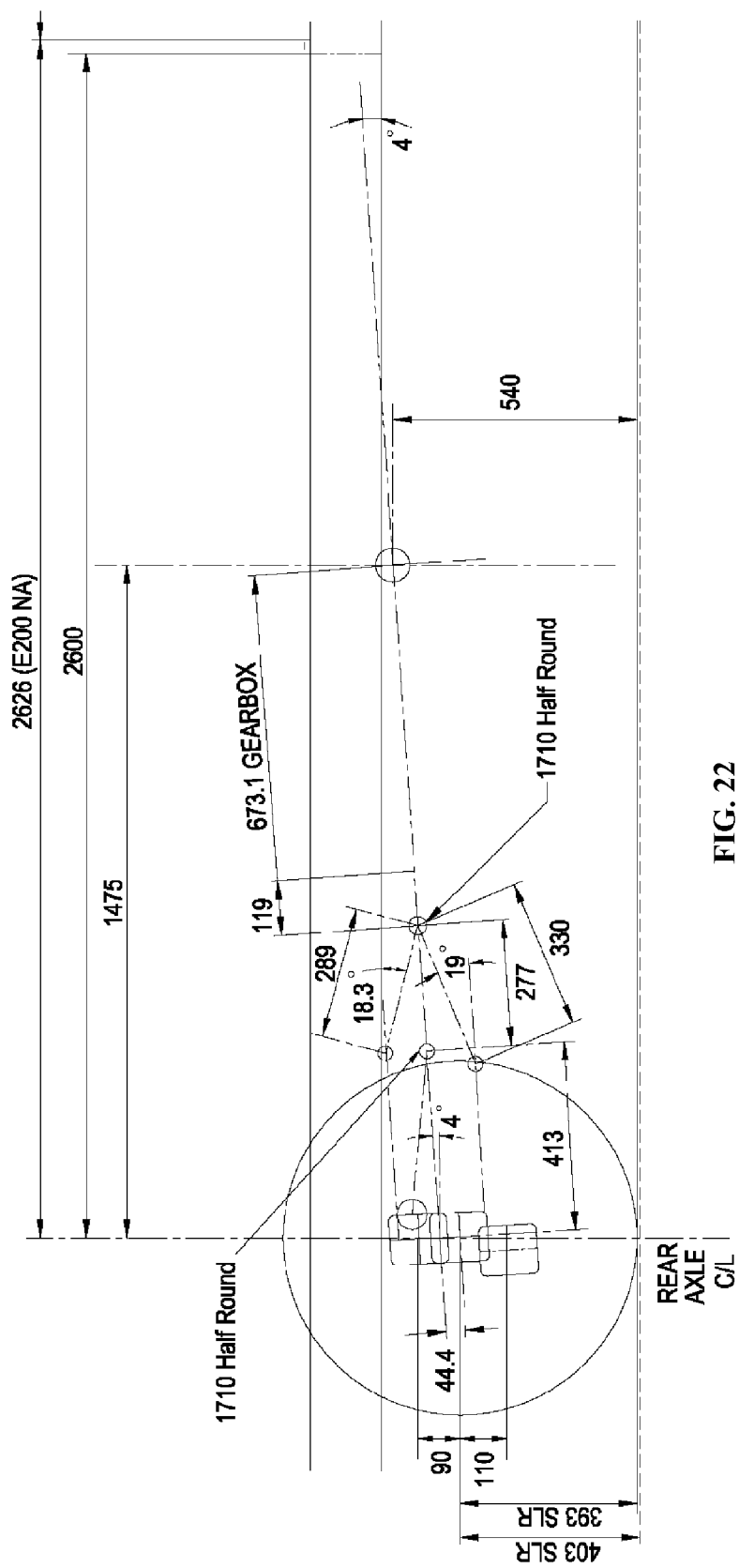
FIGS. 22-23 show the associated drivelines for differing gearbox configurations.
Figure 23:
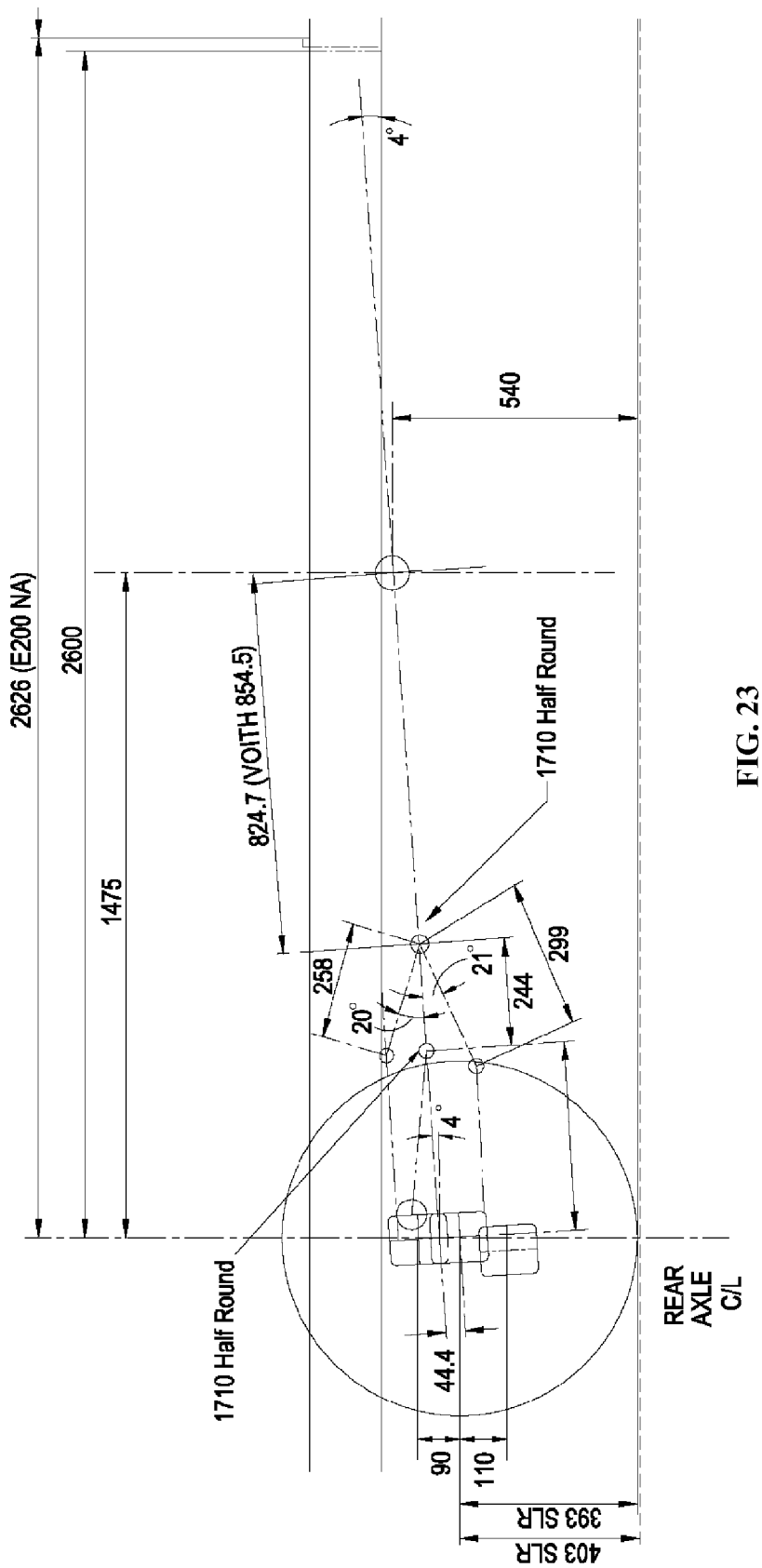

FIGS. 18-21 show various side and plan views of a rear-axle suspension arrangement 400, through sections, which may optionally be used with the vehicle 100. In this example, the rear-axle can be considered the drive axle. Here, links 410a-410d, which may be considered fixed links, attach the chassis to, in this case, a rear differential 420, which in turn is connected to a drive shaft and the rear wheels. FIGS. 22-23 show the associated drivelines from the rear-axle to the rear of the vehicle for two differing gearbox configurations, demonstrating the ability to achieve a short rear overhang with transverse mounted engine.

It will be appreciated that any of the aforementioned mounts, springs, dampeners, etc. may have other functions in addition to the mentioned functions and that these functions may be performed by the same mount/spring/dampener.

The applicant hereby discloses in isolation each individual feature described herein, and/or disclosed in the associated Figures, and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of any claims. The applicant indicates that aspects of the invention may consist of any such individual feature or combination of features. In view of the foregoing description it will be evident to a person skilled in the art that various modifications may be made within the scope of the invention.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A suspension arrangement for a passenger service vehicle, the suspension arrangement comprising:
   one or more suspension mounts, wherein each of the one or more suspension mounts is configured to attach a front axle of a passenger service vehicle to a chassis, each of the suspension mounts extending between a suspension air spring and the front axle such that the suspension air spring is mounted directly above the front axle and suspension mount, and each of the one or more suspension mounts being further configured to mount with one or more suspension components of the following: suspension arm links, suspension air springs, suspension dampeners, anti-roll bars and Panhard rods;
   wherein each of the one or more suspension mounts comprises a dished surface configured to allow mounting of an air spring; and wherein the dished surface is angled from a body axis of the one or more suspension mounts, and an angle between the dished surface and the body axis is between 90 and 100 degrees.

2. The suspension arrangement according to claim 1, comprising one or more of the following: suspension arm links, suspension air springs, suspension dampeners, anti-roll bars, and Panhard rods.

3. The arrangement according to claim 1 wherein each of the one or more suspension mounts comprises one or more mounting apertures configured to allow for mounting at least one of the one or more suspension components, and the mounting apertures are preformed with the one or more suspension mounts.

4. The arrangement according to claim 1, wherein the suspension arrangement is configured such that the air spring is housed between the dished portion and a portion of the chassis.

5. The suspension arrangement according to claim 1, wherein the suspension arrangement is associated with a rear drive axle.

6. A suspension arrangement for a passenger service vehicle, the suspension arrangement comprising:
one or more suspension mounts, wherein each of the one or more suspension mounts is configured to attach a front axle of a passenger service vehicle to a chassis, each of the suspension mounts extending between a suspension air spring and the front axle such that the suspension air spring is mounted directly above the front axle and suspension mount, and each of the one or more suspension mounts being further configured to mount with one or more suspension components of the following: suspension arm links, suspension air springs, suspension dampeners, anti-roll bars and Panhard rods;
wherein each of the one or more suspension mounts comprises a dished surface configured to allow mounting of an air spring; and
wherein each of the one or more suspension mounts comprises a body portion extending between the dished surface and an axle-mount portion, and the body portion comprises one or more curved ribs.

7. The arrangement according to claim 6, wherein the axle-mount portion comprises one or more depending lugs, and each of the one or more depending lugs comprising mounting apertures.

8. The arrangement according to claim 7, wherein each of the one or more suspension mounts is a unitary mount from a single cast.

9. A passenger service vehicle comprising:
one or more suspension mounts, wherein each of the one or more suspension mounts attaches a drop beam front axle to a chassis, each of the suspension mounts extending between a suspension air spring and the front axle such that the suspension air spring is mounted directly above the front axle and suspension mount, and each of the one or more suspension mounts being further mounted with one or more suspension components of the following: suspension arm links, suspension air springs, suspension dampeners, anti-roll bars and Panhard rods;
wherein the one or more suspension mounts comprises a dished surface configured to allow mounting of an air spring; and
wherein the dished surface is angled from a body axis of the one or more suspension mounts, and an angle between the dished surface and the body axis is between 90 and 100 degrees.

10. The vehicle according to claim 9, wherein each of the one or more suspension mounts comprises one or more mounting apertures configured to allow for mounting each of the one or more suspension components, and the mounting apertures are preformed with the one or more suspension mounts.

11. The vehicle according to claim 9, wherein each of the one or more suspension mounts comprises a body portion extending between the dished surface and an axle-mount portion, and the body portion comprising one or more curved ribs.

12. The vehicle according to claim 11, wherein the axle-mount portion comprises one or more depending lugs, and each of the one or more depending lugs comprises mounting apertures.

13. The vehicle according to claim 9, wherein the vehicle has an overall length of about 35 feet or less and has an unladen weight of around 25,000 lbs or less.

14. The vehicle according to claim 9, wherein the vehicle is configured to provide at least 35 passenger seats.

15. The vehicle according to claim 9, including a front overhang of around 250 cm or less.

16. The vehicle according to claim 9, wherein the vehicle is a single deck vehicle.

* * * * *